United States Patent
Kim et al.

(10) Patent No.: US 9,722,748 B2
(45) Date of Patent: Aug. 1, 2017

(54) METHOD FOR RECEIVING DOWN LINK SIGNAL AND APPARATUS THEREFOR

(71) Applicant: LG ELECTRONICS INC., Seoul (KR)

(72) Inventors: Kijun Kim, Seoul (KR); Youngtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 14/772,031

(22) PCT Filed: Mar. 18, 2014

(86) PCT No.: PCT/KR2014/002271
§ 371 (c)(1),
(2) Date: Sep. 1, 2015

(87) PCT Pub. No.: WO2014/157867
PCT Pub. Date: Oct. 2, 2014

(65) Prior Publication Data
US 2016/0006549 A1 Jan. 7, 2016

Related U.S. Application Data

(60) Provisional application No. 61/805,127, filed on Mar. 25, 2013.

(51) Int. Cl.
*H04L 12/26* (2006.01)
*H04L 5/00* (2006.01)
*H04B 7/0413* (2017.01)
*H04B 7/0456* (2017.01)
(Continued)

(52) U.S. Cl.
CPC ......... *H04L 5/0048* (2013.01); *H04B 7/0413* (2013.01); *H04B 7/0456* (2013.01); *H04B 7/068* (2013.01); *H04B 7/0617* (2013.01); *H04B 7/0619* (2013.01); *H04B 7/0626* (2013.01); *H04B 7/0658* (2013.01); *H04B 7/0684* (2013.01); *H04B 7/0691* (2013.01); *H04B 17/318* (2015.01); *H04B 17/336* (2015.01); *H04L 1/0026* (2013.01); *H04L 1/206* (2013.01); *H04W 24/08* (2013.01); *H04W 72/042* (2013.01); *H04L 5/001* (2013.01)

(58) Field of Classification Search
CPC ...................................... H04L 1/0026
See application file for complete search history.

(56) References Cited

U.S. PATENT DOCUMENTS 8,208,434 B2 * 6/2012 Sayana .................. H04B 7/024
370/329
9,307,462 B2 * 4/2016 Hu ..................... H04W 36/0083
(Continued)

FOREIGN PATENT DOCUMENTS

| WO | 2012/157870 | 11/2012 |
| WO | 2013/024350 | 2/2013 |

OTHER PUBLICATIONS

PCT International Application No. PCT/KR2014/002271, Written Opinion of the International Searching Authority dated Jul. 16, 2014, 11 pages.

*Primary Examiner* — Guang Li
(74) *Attorney, Agent, or Firm* — Lee, Hong, Degerman, Kang & Waimey

(57) ABSTRACT

A method for receiving downlink signal and an apparatus therefor are disclosed. A method for enabling a user equipment (UE) to receive a downlink signal from an eNB including a plurality of antenna ports in a wireless communication system includes: receiving a precoded reference signal according to a precoded reference signal configuration for the plurality of antenna ports; measuring receive (Rx) power of the reference signal for each of the plurality of antenna ports; and reporting, to the eNB, at least one of Rx power values of the reference signal, measured for the plurality of antenna ports. The reference signal is for serving cell search of the UE and precoding is applied to the plurality of antenna ports through which the reference signal is transmitted.

12 Claims, 10 Drawing Sheets

(51) Int. Cl.

| | | |
|---|---|---|
| *H04B 7/06* | (2006.01) | |
| *H04B 17/318* | (2015.01) | |
| *H04B 17/336* | (2015.01) | |
| *H04W 24/08* | (2009.01) | |
| *H04W 72/04* | (2009.01) | |
| *H04L 1/00* | (2006.01) | |
| *H04L 1/20* | (2006.01) | |

(56) References Cited

U.S. PATENT DOCUMENTS

| | | | |
|---|---|---|---|
| 9,326,258 B2* | 4/2016 | Takaoka | H04W 52/42 |
| 2010/0323711 A1* | 12/2010 | Damnjanovic | H04B 7/0617 |
| | | | 455/450 |
| 2012/0052828 A1* | 3/2012 | Kamel | H04B 7/0408 |
| | | | 455/226.2 |
| 2012/0147766 A1 | 6/2012 | Kim et al. | |
| 2012/0213261 A1* | 8/2012 | Sayana | H04L 5/0094 |
| | | | 375/224 |
| 2013/0012252 A1* | 1/2013 | Suzuki | H04W 52/325 |
| | | | 455/509 |
| 2013/0039199 A1* | 2/2013 | Liao | H04B 7/0626 |
| | | | 370/252 |
| 2013/0114498 A1* | 5/2013 | Park | H04W 4/06 |
| | | | 370/312 |
| 2014/0153536 A1* | 6/2014 | Ouchi | H04W 52/146 |
| | | | 370/329 |
| 2015/0085692 A1* | 3/2015 | Wang | H04B 17/318 |
| | | | 370/252 |
| 2015/0249961 A1* | 9/2015 | Wang | H04W 36/0083 |
| | | | 370/329 |
| 2016/0277081 A1* | 9/2016 | Wei | H04B 7/0482 |

\* cited by examiner

FIG. 5
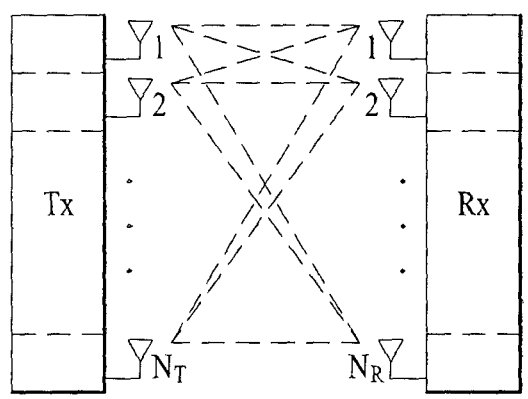
(a)
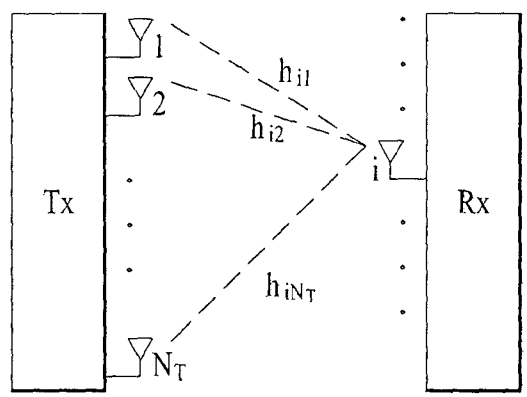
(b)

FIG. 7
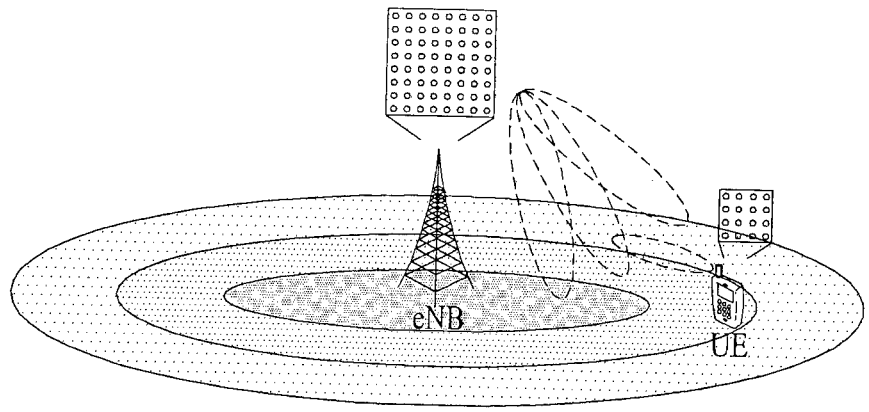
(a)
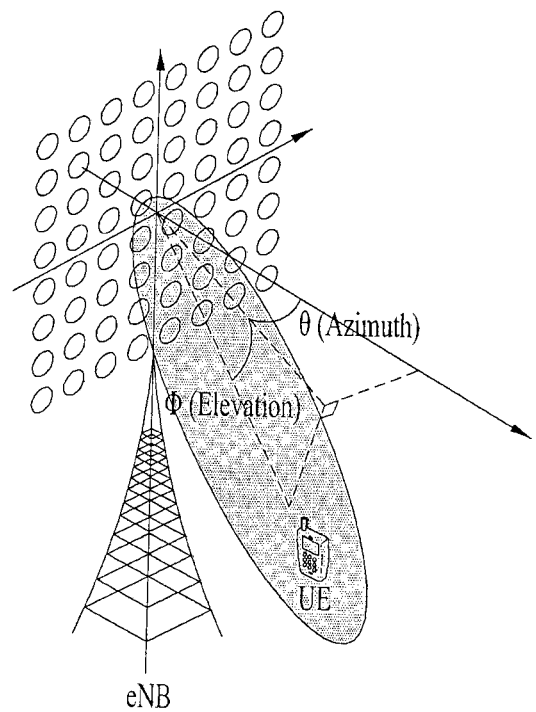
(b)

METHOD FOR RECEIVING DOWN LINK SIGNAL AND APPARATUS THEREFOR

CROSS-REFERENCE TO RELATED APPLICATIONS

This application is the National Stage filing under 35 U.S.C. 371 of International Application No. PCT/KR2014/002271, filed on Mar. 18, 2014, which claims the benefit of U.S. Provisional Application No. 61/805,127, filed on Mar. 25, 2013, the contents of which are all hereby incorporated by reference herein in their entirety.

TECHNICAL FIELD

The present invention relates to a wireless communication system and, more particularly, to a method for receiving downlink signal, and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for efficiently receiving signal in a downlink.

It will be appreciated by persons skilled in the art that the effects that can be achieved through the present invention are not limited to what has been particularly described hereinabove and other advantages of the present invention will be more clearly understood from the following detailed description.

Technical Solution

The object of the present invention can be achieved by providing a method for receiving, by a user equipment (UE), downlink signal from an eNB having a plurality of antenna ports in a wireless communication system, the method including: receiving reference signal according to a pre-coded reference signal configuration composing the plurality of antenna ports; measuring received power value of the reference signal for each of the plurality of antenna ports; and reporting, to the eNB, at least one of measured received power values for the plurality of antenna ports, wherein the reference signal is for searching a serving cell of the UE and each of the reference signal which is trasnmitted through the plurality of antenna ports is precoded.

Additionally or alternatively, resources for the precoded reference signal may include at least part of resources for a channel state information-reference signal (CSI-RS) configurable for the UE.

Additionally or alternatively, the reporting may include transmitting, to the eNB, a maximum value from among the measured received power values for the plurality of antenna ports, and selected received power value(s) ranging between a predetermined threshold and the maximum value.

Additionally or alternatively, the reporting may include transmitting, to the eNB, a power value of the reference signal received from a predetermined reference antenna port from among the plurality of antenna ports, and selected received power value(s) ranging between a predetermined threshold and the power value.

Additionally or alternatively, the reporting the at least one of measured received power values may be performed for antenna groups each of which is composed of two or more antenna ports, wherein the antenna groups may be configured to have antenna group levels corresponding to the number of antenna ports belonging thereto.

Additionally or alternatively, two or more antenna groups from among the antenna groups may include at least one identical antenna port.

Additionally or alternatively, the method may further include transmitting, to the eNB, information about an antenna group having the highest received power value of the reference signal according to the antenna group levels.

Additionally or alternatively, the method may further include transmitting, to the eNB, information about an antenna group having the highest received power value of the reference signal from among antenna groups of all antenna group levels.

Additionally or alternatively, the method may further include applying an offset designated for each of the antenna group levels to received power of the reference signal when comparing received power values for antenna groups belonging to different antenna group levels to derive the highest received power value of the reference signal.

Additionally or alternatively, the method may further include receiving information on determination of handover to another eNB based on the reported at least one of measured received power values.

Additionally or alternatively, the method may further include receiving a configuration related to a CSI-RS based on the reported at least one of measured received power values.

Additionally or alternatively, the method may further include receiving information on another reference signal to be used to detect the reference signal.

Additionally or alternatively, the plurality of antenna ports may be two-dimensionally arranged.

In another aspect of the present invention, provided herein is a UE configured to receive downlink signal from an eNB having a plurality of antenna ports in a wireless communication system, the UE including: a radio frequency (RF) unit; and a processor configured to control the RF unit, wherein the processor is configured to receive reference signal according to a precoded reference signal configuration composing the plurality of antenna ports, to measure received power value of the reference signal for each of the plurality of antenna ports and to report, to the eNB, at least one of measured received power values for the plurality of antenna ports, wherein the reference signal is for searching a serving cell of the UE and each of the reference signal which is trasnmitted through the plurality of antenna ports is precoded.

In another aspect of the present invention, provided herein is method for transmitting, by an eNB having a plurality of antenna ports to, a downlink signal to a UE in a wireless communication system, the method including: transmitting reference signal according to a precoded reference signal configuration composing the plurality of antenna ports; and receiving, from the UE, at least one of received power values of the reference signal measured by the UE for the plurality of antenna ports, wherein the reference signal is for searching a serving cell of the UE and each of the reference signal which is trasnmitted through the plurality of antenna ports is precoded.

The above description corresponds to part of embodiments of the present invention and various embodiments reflecting technical characteristics of the present invention are derived and understood by those skilled in the art on the basis of the following detailed description of the present invention.

Advantageous Effects

As is apparent from the above description, exemplary embodiments of the present invention can efficiently receive signal in a downlink, such that a higher-quality communication environment can be expected.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a block diagram showing a multi-input multi-output (MIMO) used in a 3GPP LTE/LTE-A system;

FIG. 7 illustrate an antenna structure in accordance with embodiment(s) of the disclosure

BEST MODE

Figure 1:
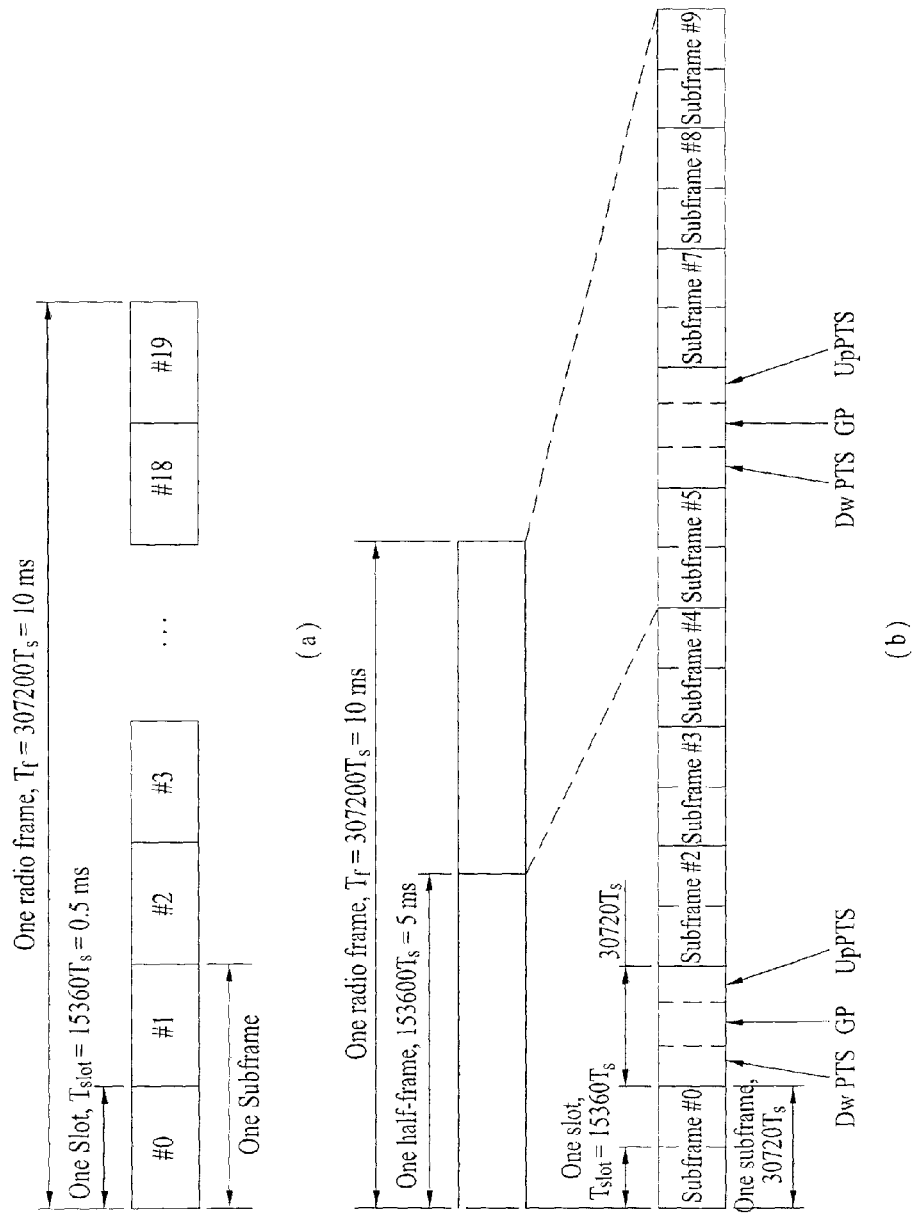
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals)

transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
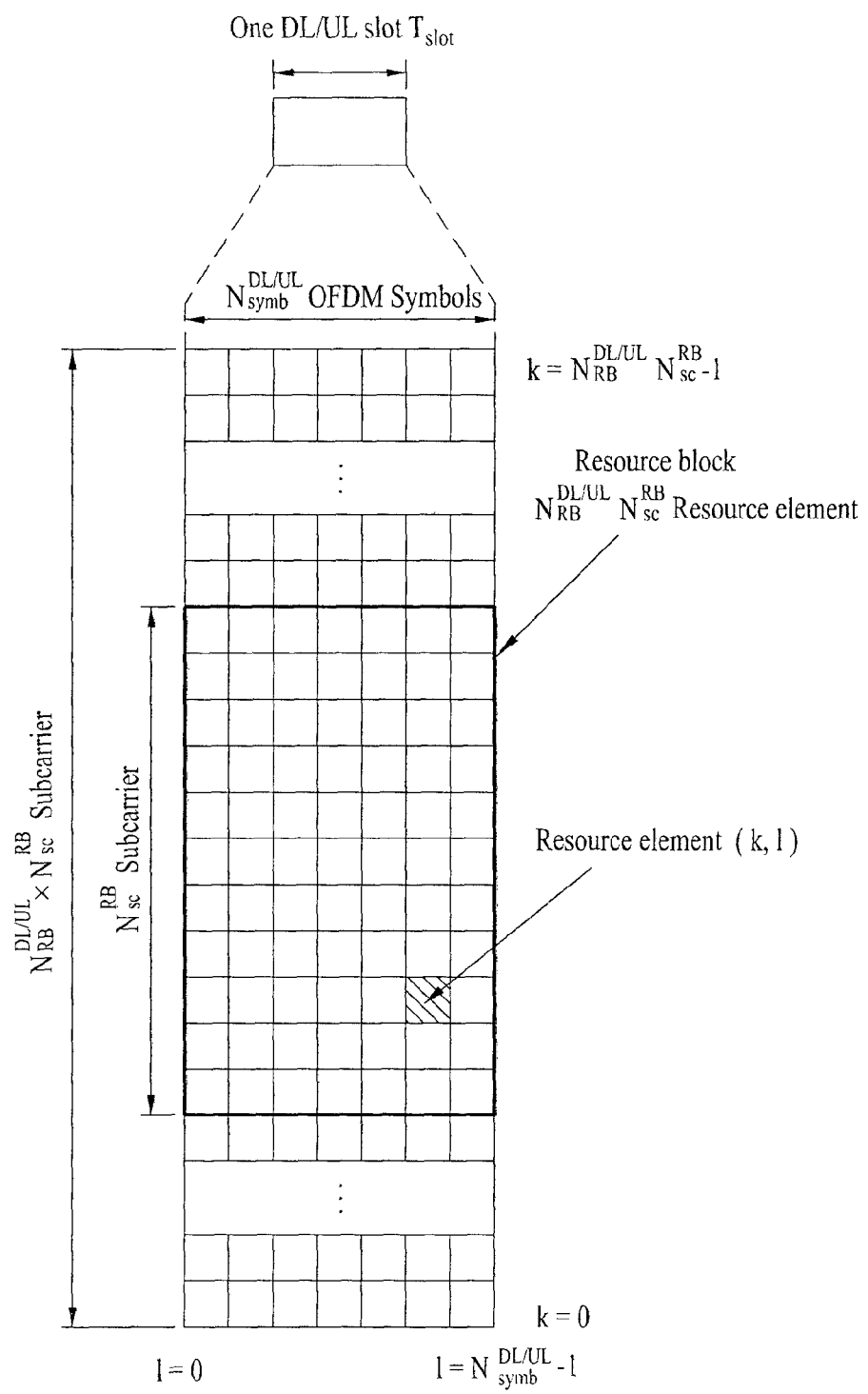
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL*UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
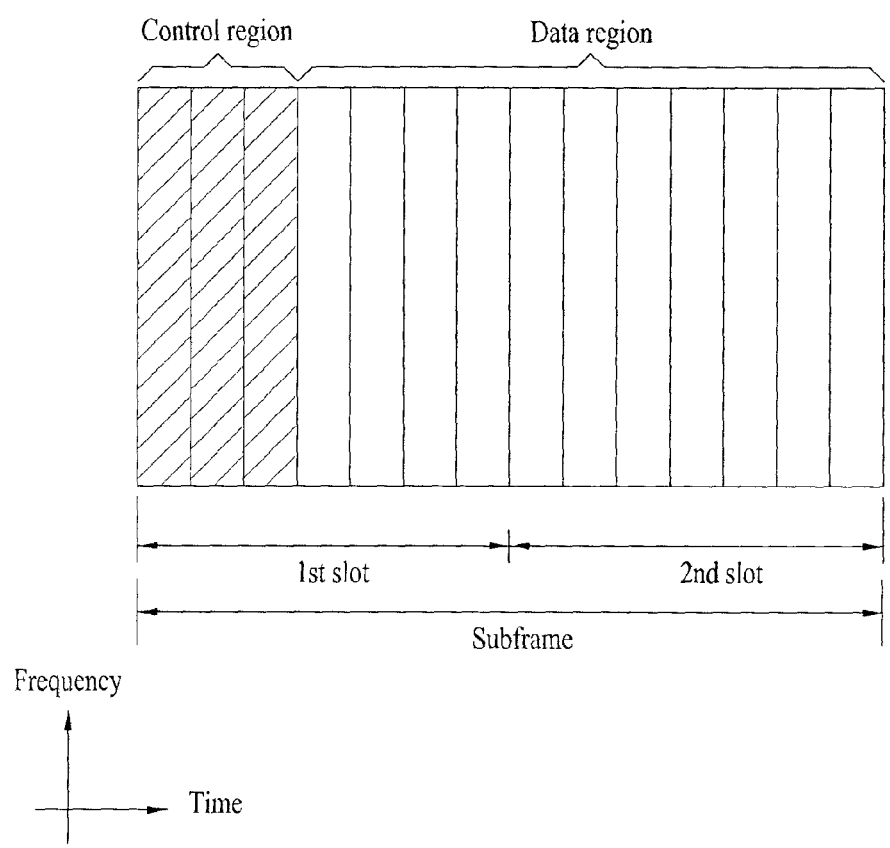
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
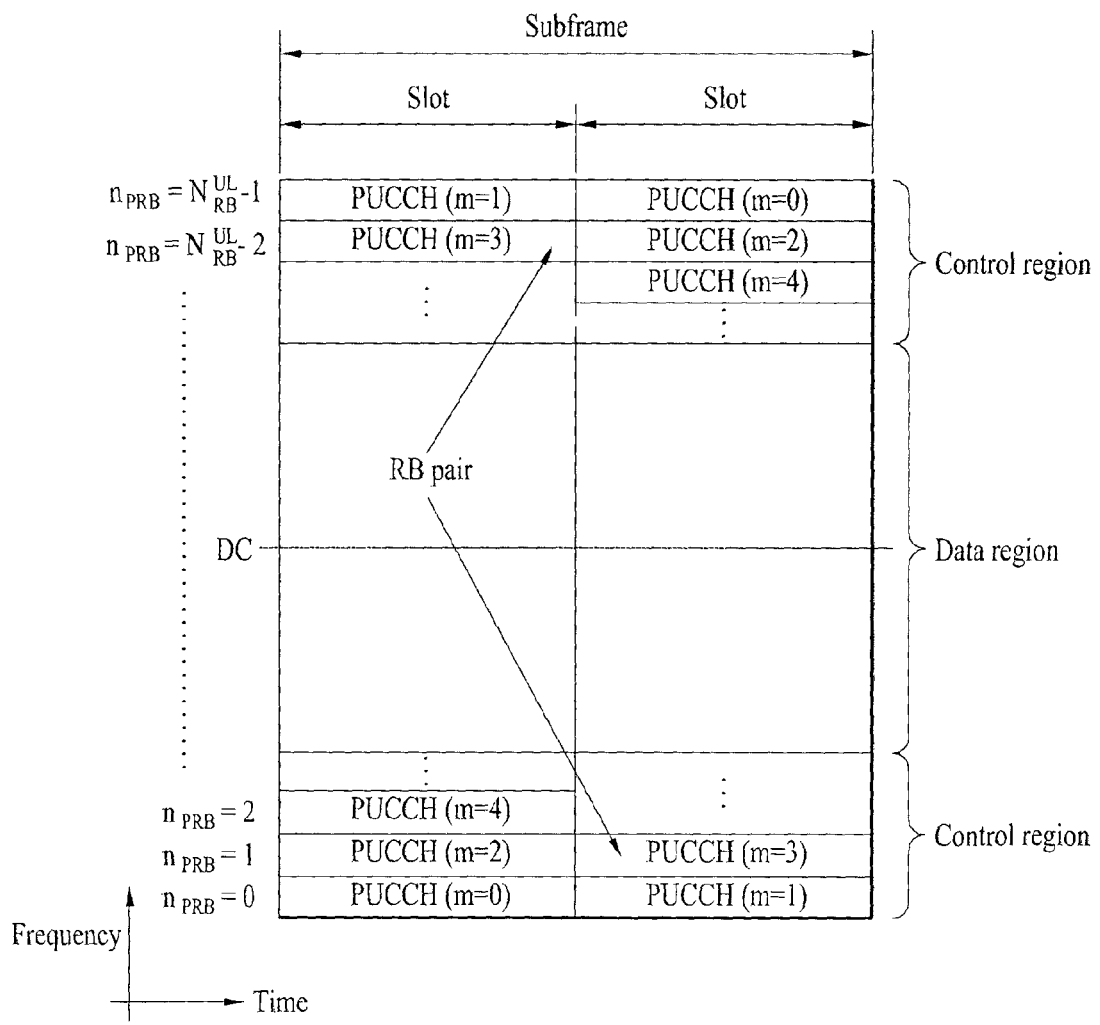
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned for UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control iinformation.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$S = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s}[\hat{s}_1, \hat{s}_2, \ldots, \hat{s}_{N_T}]^T = [Ps_1, P_{s2}, \ldots, P_{N_T}]^T \quad \text{[Equation 3]}$$

The transmission power-controlled transmission information vector i may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots x_{N_T}$ may be generated by multiplying the transmission power-controlled information vector $\hat{S}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ denotes a weight between an i-th Tx antenna and j-th information. W is also called a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{Ndi\,R}]^T \quad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Actual channels experience the above channel matrix H and then are added with Additive white Gaussian noise (AWGN). The AWGN $n_1, n_2, \ldots, n_{N_R}$ added to the NR Rx antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \quad \text{[Equation 11]}$$

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Codebook Based Precoding Scheme

A precoding scheme for appropriately distributing transmission information according to the channel states of antennas is applicable in order to support MIMO transmission. A codebook based precoding scheme refers to a scheme for predetermining a set of precoding matrices between a transmitter and a receiver, measuring channel information from the transmitter at the receiver, feeding a suitable precoding matrix (that is, a precoding matrix index (PMI)) back to the transmitter and applying the suitable precoding matrix to signal transmission at the transmitter. Since a suitable precoding matrix is selected from the predetermined set of precoding matrices, an optimal precoding matrix may not always be applied but feedback overhead can be reduced as compared to explicit feedback of optimal precoding information in actual channel information.

Figure 6:
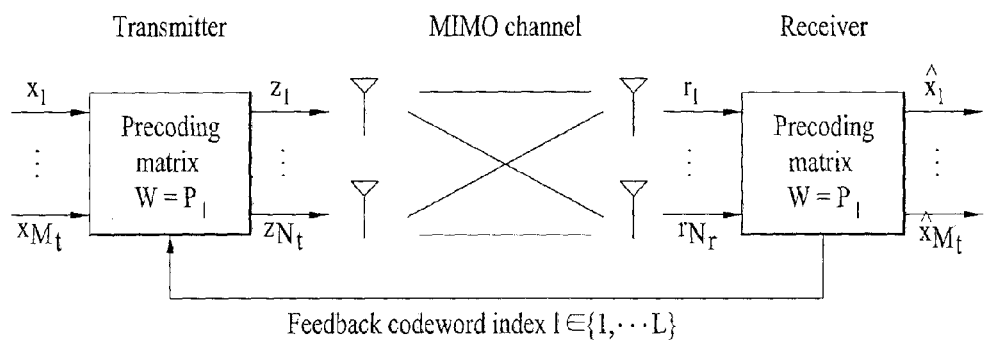
FIG. 6 is a diagram illustrating codebook based beamforming.

FIG. 6 is a diagram illustrating the basic concept of codebook based precoding.

In a codebook based precoding scheme, a transmitter and a receiver share codebook information including a predetermined number of precoding matrices predetermined according to transmission rank, number of antennas, etc. That is, if feedback information is finite, a precoding based codebook scheme may be used. The receiver may measure a channel state via a received signal and feed a finite number of pieces of preferred precoding matrix information (that is, the indices of the precoding matrices) back to the transmitter based on the above-described codebook information. For example, the receiver may measure the received signal using a maximum likelihood (ML) or minimum mean square error (MMSE) method and select an optimal precoding matrix. Although FIG. 6 shows the case in which the receiver transmits precoding matrix information on a per codeword basis, the present invention is not limited thereto.

The transmitter, which has received feedback information from the receiver, may select a specific precoding matrix from the codebook based on the received information. The transmitter, which has selected the precoding matrix, may perform precoding by multiplying layer signals corresponding in number to transmission rank by the selected precoding matrix and transmit the precoded signal via a plurality of antennas. In the precoding matrix, the number of rows is equal to the number of antennas and the number of columns is equal to the rank value. Since the rank value is equal to the number of layers, the number of columns is equal to the number of layers. For example, if the number of transmit antennas is 4 and the number of transmit layers is 2, a 4×2 precoding matrix may be configured. Information transmitted via the layers may be mapped to the antennas via the precoding matrix.

The receiver, which has received the signal precoded and transmitted by the transmitter, may perform an inverse process of precoding performed by the transmitter to restore a received signal. In general, the precoding matrix satisfies a unitary matrix (U) condition such as $U*U^H=I$ and the inverse process of precoding may be performed by multiplying a Hermitian matrix ($P^H$) of the precoding matrix P used for precoding of the transmitter by the received signal.

For example, Table 4 below shows a codebook used for downlink transmission using 2 transmit antennas in 3GPP LTE release-8/9 and Table 5 below shows a codebook used for downlink transmission using 4 transmit antennas in 3GPP LTE release-8/9.

TABLE 4

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |

TABLE 4-continued

| Codebook index | Number of rank | |
|---|---|---|
| | 1 | 2 |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5 above, $W_n^{(s)}$ is obtained by a set $\{s\}$ composed of an equation $W_n = I - 2u_n u_n^H / u_n^H u_n$. At this time, I denotes a 4×4 unitary matrix and $u_n$ denotes a value given in Table 5.

As shown in Table 4 above, a codebook for 2 transmit antennas has a total of 7 precoding vectors/matrices. Since a unitary matrix is for an open-loop system, the total number of precoding vectors/matrices for precoding of a closed-loop system is 6. In addition, a codebook for 4 transmit antennas shown in Table 5 above has a total of 64 precoding vectors/matrices.

Such a codebook has common properties such as a constant modulus (CM) property. a nested property and a constrained alphabet property. The CM property means that elements of all precoding matrices in the codebook do not include "0" and have the same size. The nested property means that a precoding matrix having a low rank is designed to be composed of a subset of specific columns of a precoding matrix having a high rank. The constrained alphabet property means that the elements of all the precoding matrices in the codebook are constrained. For example, the elements of the precoding matrix may be constrained to only an element ±1 used for binary phase shift keying (BPSK), an element ±1,±j used for quadrature phase shift keying (QPSK) or an element $$\pm 1, \pm j, \pm \frac{(1+j)}{\sqrt{2}}, \pm \frac{(-1+j)}{\sqrt{2}}$$

used for 8-PSK. The example of the codebook of Table 5 above may have the constrained alphabet property since the letters of the elements of all the precoding matrices in the codebook are composed of $$\left\{\pm 1, \pm j, \pm \frac{(1+j)}{\sqrt{2}}, \pm \frac{(-1+j)}{\sqrt{2}}\right\}.$$

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 6 below.

TABLE 6

| Scheduling scheme | Periodic CSI transmission | Aperiodic CSI transmission |
| --- | --- | --- |
| Frequency non-selective | PUCCH | — |
| Frequency selective | PUCCH | PUSCH |

Referring to Table 6, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI transmission via PUSCH after receiving CSI transmission request control signal.

A control signal for requesting transmission of a CSI may be included in a PUSCH scheduling control signal (UL grant) transmitted via a PDCCH signal. Table 7 below shows the mode of the UE when the CQI, the PMI and the RI are transmitted via the PUSCH.

TABLE 7

| | | PMI feedback type | | |
| --- | --- | --- | --- | --- |
| | | No PMI | Single PMI | Multiple PMIs |
| PUSCH CQI feedback type | Wideband (wideband CQI) | | | Mode 1-2 |
| | UE selection (subband CQI) | Mode 2-0 | | Mode 2-2 |
| | Higher layer configuration (subband CQI) | Mode 3-0 | Mode 3-1 | |

The transmission mode of Table 7 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 8 below.

TABLE 8

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 8. Referring to Table 8, in Mode 2-0 and Mode 2-1, a bandwidth (BP) part is a set of subbands continuously located in a frequency domain and may cover a system bandwidth or a specified set S. In Table 8, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 2: A wideband CQI and a PMI (WB-CQI/PMI) are transmitted.

iii) Type 3: An RI is transmitted.

iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 8, the transmission periodicity of the wideband CQI/PMI and the subband CQI is P and has the following properties.

The wideband CQI/PMI has periodicity of H*P. At this time, H=J*K+1, wherein J denotes the number of BPs and K denotes the number of periodicities of the BP. That is, the UE performs transmission at {0, H, 2H, ... }.

The CQI is transmitted at a time of J*K rather than when the wideband CQI/PMI is transmitted.

In Table 8, the transmission periodicity of the RI is a multiple m of that of the wideband CQI/PMI and has the following properties.

The offsets of the RI and the wideband CQI/PMI are 0 and, if the RI and the wideband CQI/PMI are transmitted in the same subframe, the wideband CQI/PMI is not transmitted.

Parameters P, H, K and O described in Table 8 are all determined at the higher layer of the UE and signaled to a physical layer of the UE.

Hereinafter, a feedback operation according to the mode of the UE will be described with reference to Table 8. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rel-10.

Each BS may transmit a CSI-RS for channel measurement to the UE via a plurality of antenna ports and each UE may calculate channel state information based on the CSI-RS and transmit the channel state information to each BS in response thereto.

In wireless communication systems following LTE Rel-12, introduction of an active antenna system (SSA) is considered. AAS refers to a system in which each antenna includes an active element such as an amplifier, differently from a conventional passive antenna system in which an amplifier capable of adjusting the phase and magnitude of a signal is separated from an antenna. AAS is efficient in terms of energy and maintenance costs since an additional cable, connector, hardware, etc. for connecting an amplifier to an antenna for active antenna configuration are not needed. Particularly, AAS enables enhanced MIMO, such as formation of an accurate beam pattern in consideration of beam direction and beam width and formation of a three-dimensional (3D) beam pattern, because AAS supports electronic beam control per antenna.

With the introduction of an enhanced antenna system such as AAS, large-scale MIMO having a plurality of input/output antennas and a multi-dimensional antenna structure is considered. For example, when a two-dimensional (2D) antenna array rather than a conventional linear antenna structure is formed, a 3D beam pattern may be formed according to active antennas of AAS. When the 3D beam pattern is used for Tx antennas, quasi-static or dynamic beam pattern formation in the vertical direction as well as in the horizontal direction may be performed and sector formation in the vertical direction, for example, may be considered. In terms of the Rx antenna, signal power increase according to antenna array gain may be expected when a reception beam is formed using an Rx antenna. Accordingly, an eNB may receive signals transmitted from UEs through a plurality of antennas on uplink. Here, the UEs may set Tx power thereof to a very low value in consideration of the gain of Rx antennas to reduce the influence of interference. FIG. 7 illustrates a system in which an eNB or a UE has a plurality of Tx/Rx antennas capable of AAS based 3D beam formation.

[Cell Coverage of Large-Scale MIMO]

A MIMO system, for example, a system including N Tx antennas may perform beamforming to increase Rx power to up to N times that of a single-antenna system at a specific point even if transmission is carried out with the same Tx power in the MIMO system and single-antenna system.

Even in an eNB having a plurality of antennas, beamforming in a specific direction is not performed in order to enable all UEs in the coverage of the eNB to receive channels on which a CRS, PSS/SSS, PBCH and broadcast information are transmitted. The eNB increases transmission efficiency by performing beamforming on a PDSCH on which unicast information is transmitted to a specific UE according to the position of the UE and link state. That is, transmitted data streams on the PDSCH are precoded to form a beam in a specific direction and transmitted through a plurality of antenna ports. Accordingly, when Tx power of a CRS is equal to Tx power of the PDSCH, Rx power of the precoded PDSCH beamformed to the specific UE may be up to N times the average Rx power of the CRS.

LTE Rel-11 considers an eNB having a maximum of 8 Tx antennas. This means that Rx power of the precoded PDSCH may be eight times CRS average Rx power. However, when the eNB has 100 or more Tx antennas due to introduction of a large-scale MIMO system, the precoded PDSCH may have Rx power more than 100 times CRS Rx power. Consequently, the coverage of a CRS transmitted by a specific eNB may not correspond to the coverage of a DM-RS based PDSCH owing to introduction of the large-scale MIMO system.

This phenomenon may be magnified when a difference between the numbers of Tx antennas of neighboring eNBs is large, for example, when a macro cell having 64 Tx antennas and a pico cell having a single Tx antenna are located adjacent to each other. Since a macro cell that serves many UEs is expected to increase the number of antennas during initial deployment of large-scale MIMO, there is a large difference between the numbers of Tx antennas of neighboring eNBs in a heterogeneous network including a macro cell, a micro cell and a pico cell. For example, (if CRS Tx power is equal to PDSCH Tx power as in the aforementioned example), CRS coverage corresponds to PDSCH coverage in the case of a pico cell having a single Tx antenna. In the case of a macro cell having 64 Tx antennas, however, CRS coverage is larger than PDSCH coverage according to beamforming. Therefore, an eNB providing highest quality of PDSCH may not be selected as a serving cell when initial access and handover are selected depending only on CRS received quality, that is, reference signal received power (RSRP) or reference signal received quality (RSRQ), at the boundary of the macro cell and the pico cell. A simple solution to this problem is to assume that PDSCH Rx power of an eNB having N Tx antennas is N times that of an eNB having a single Tx antenna. However, this solution is not ideal when a case in which the eNB cannot perform beamforming in every direction is considered.

[RRM-RS]

The present invention proposes a method for transmitting a precoded RS and measuring radio resource management (RRM) for the same. In the following description, the precoded RS is referred to as an RRM-RS. The term "RRM-RS" does not limit the scope of the present invention and other terms may be used. The RRM-RS is configured for a plurality of antenna ports and beamforming is set differently for the antenna ports such that a UE can measure RSRP per transmission beam. In other words, different precoding matrices may be applied to the antenna ports, or reference signal which is transmitted from each of the antenna ports is precoded independently or separately. For example, when an eNB is capable of beamforming in M directions, RRM-RS is configured for M antenna ports.

[Period and Multiplexing of RRM-RS]

M-port RRM-RS may be code-division-multiplexed or frequency/time-division-multiplexed in the same subframe and transmitted. That is, transmission signals for the M ports may be transmitted using different transport REs in the same subframe or may be discriminated from one another without interference using orthogonal scrambling codes for the ports when transmitted using the same RE.

Alternatively, the number of antenna ports capable of simultaneously transmitting the RRM-RS through one subframe may be set to K and the RRM-RS may be distributed to M/K subframes and transmitted. In this case, configuration parameters with respect to the RRM-RS may include the total number of ports, M, and the number of ports for simultaneous transmission through one subframe, K. The RRM-RS configuration parameters may include RRM-RS transmission period P and offset O. Here, the RRM-RS transmission period is defined as an interval between subframes in which the RRM-RS is transmitted. For example, when P=10, O=5, M=64 and K=32, the RRM-RS is transmitted in subframes with subframe indices (SFI) of 5, 15, 25, 35, . . . . Specifically, the RRM-RS is transmitted in such a manner that RRM-RS corresponding to RRM-RS antenna ports #0 to #31 is transmitted in subframe with SFI=5, RRM-RS corresponding to RRM-RS antenna ports #32 to #63 is transmitted in subframe with SFI=15, and RRM-RS corresponding to RRM-RS antenna ports #0 to #31 is transmitted again in subframe with SFI=25.

Alternatively, the RRM-RS transmission period is defined as a subframe interval at which an RS corresponding to the same antenna port is transmitted and RRM-RS is transmitted with the antenna ports distributed to (M/K) consecutive subframes. For example, P=20, O=5, M=64 and K=32, RRM-RS is transmitted in subframes with SFIs of 5, 6, 25, 26, 45, 46, . . . Specifically, RRM-RS is transmitted in such a manner that RRM-RS corresponding to RRM-RS antenna ports #0 to #31 is transmitted in a subframe with SFI=5, RRM-RS corresponding to RRM-RS antenna ports #32 to #63 is transmitted in a subframe with SFI=6 and RRM-RS corresponding to RRM-RS antenna ports #0 to #31 is transmitted again in subframe with SFI=25.

[RSRP Measurement and Reporting]

RSRP of RRM-RS is measured and reported per port. A plurality of RRM-RSs may be configured for a UE. When one RRM-RS is transmitted per cell, RRM-RSs transmitted by a serving cell and a neighboring cell may be configured for the UE. One cell may transmit a plurality of RRM-RSs. When the UE reports RSRP of RRM-RS, the UE may report RRM-RS corresponding to the RSRP and a port corresponding to the RRM-RS along with the RSRP.

To calculate RSRP of RRM-RS, the UE averages received signal levels of antenna ports. Here, a time window for averaging may be predetermined by an eNB or may correspond to a predetermined time (e.g. 200 ms). The UE may acquire RSRP by averaging received signal levels of RRM-RSs for antenna ports for the duration of the time window. Otherwise, the UE may obtain RSRP to be reported by filtering average received power acquired for the time window.

The UE for which a plurality of RRM-RSs is configured may measure RSRP per antenna port of RRM-RS. When R RRM-RSs are configured and the number of antenna ports for an r-th RRM-RS is $M\_r$, RSRP corresponding to an m-th antenna port with respect to the r-th RRM-RS is defined as RSRP(r,m). Here, m is in the range of 0 to $M\_r-1$. The UE may align RSRP(r,m), select RSRP of L antenna ports through which signals are received with high power and report the selected RSRP.

Alternatively, the UE may align RSRP(r,m), select an antenna port through which a signal is received with maximum power and report only RSRPs of ports, which have predetermined differences from the RSRP of the selected antenna port, that is, max(RSRP(r,m)). That is, the UE reports RSRPs of a maximum of L antenna ports, which have differences less than a predetermined threshold from max(RSRP(r,m)) as represented by the following equation.

$$RSRP(r,m) - \max(RSRP(r,m)) < Threshold \qquad [\text{Equation 12}]$$

In a modified scheme, the UE may be assigned a reference antenna port. An antenna port corresponding to RRM-RS transmitted by a serving cell, which has a beam direction similar to that of a precoded CSI-RS configured for the UE, is preferably designated as the reference antenna port. When the UE is assigned an (m_0)-th antenna port corresponding to an (r_0)-th RRM-RS as the reference antenna port, the UE reports RSRPs of other antenna ports when the RSRPS of the other antenna ports have a predetermined difference from the RSRP of the reference antenna port. That is, the UE reports the RSRPs when RSRP differences are less than a predetermined threshold as follows.

$$RSRP(r,m) - RSRP(r\_0, m\_0) < Threshold \qquad [\text{Equation 13}]$$

Figures 8, 9:
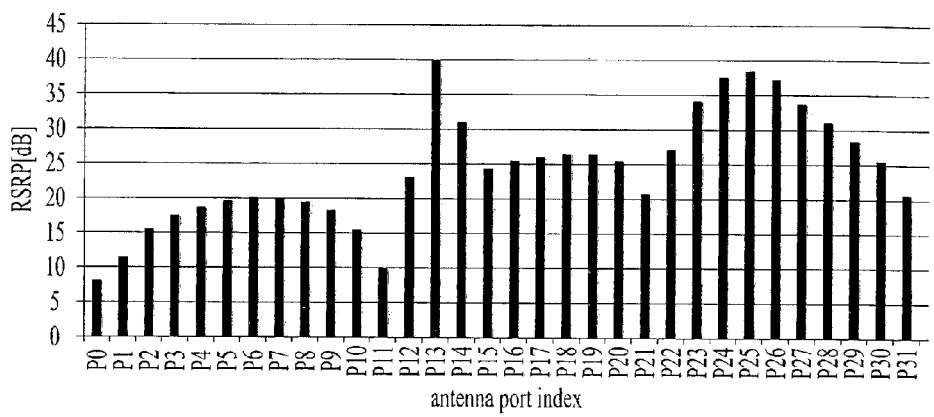
FIG. 8 is reference signal received power for each antenna port in accordance with embodiment(s) of the disclosure
FIG. 9 illustrates antenna groups in accordance with embodiment(s) of the disclosure

FIG. 8 illustrates RSRP of 32-port RRM-RS per antenna port. When RSRPs of antenna ports, which have differences of 5 dB or less from maximum RSRP, are reported, RSRPs of 35 dB or higher are reported since antenna port 13 (P13) has maximum RSRP in FIG. 8. That is, RSRPs of antenna ports 24, 25 and 26 including antenna port 13 are reported to an eNB

[Antenna Port Grouping]

The present invention sets beamforming per antenna port such that antenna ports respectively correspond to beams. Accordingly, antenna port index i can be mapped to beam index i. When beams are indexed such that the directions of an i-th beam and (i+l)-th beam are adjacent to each other, RSRPs of neighboring antenna ports are similar to each other, as illustrated in FIG. 8. While similarity is present between the i-th beam and (i+c)-th beam, similarity decreases as c increases. The number of consecutive beams having high similarity may be determined based on beam spacing, beam width and scattering degree of multiple paths.

When the UE reports an RRM-RS based RSRP measurement result to the eNB, the eNB may detect the approximate position of the UE and signal configuration of a precoded CSI-RS transmitted to the position to the UE such that the UE can measure the CSI-RS and feed back CSI (RI, PMI, CQI, etc.) for PDSCH scheduling. In addition, upon reception of reports on RSRP measurement results based on RRM-RSs transmitted from a plurality of cells, the eNB may determine a target cell to which the corresponding UE will be handed over and a precoded CSI-RS to be configured for the UC in the target cell on the basis of the RSRP measurement results. That is, RRM-RS based RSRP measurement results provide important information necessary to determine a precoded CSI-RS to be configured for the corresponding UE.

When a 4-port CSI-RS is configured in order to enable the corresponding UE to transmit a maximum of 4 data streams or to perform optimal beam switching according to fading variation on the basis of the RSRP measurement result of FIG. 8, a 4-port CSI-RS in the same direction as beam directions of RRM-RS ports 13, 24, 25 and 26 having high RSRPs may be generated and configured as an optimal CSI-RS. However, optimization and generation of a CSI-RS per UE causes excessively high overhead. Accordingly, many UEs in the same environment share a CSI-RS in order to reduce CSI-RS transmission overhead. To achieve this, CSI-RS antenna ports in one CSI-RS configuration need to be precoded to represent characteristics of a beam transmitted in a neighboring direction. That is, when 4-port CSI-RS$_1$ in the same directions as beam directions of RRM-RS ports 12, 13, 14 and 15 and 4-port CSI-RS$_2$ in the same directions as beam directions of RRM-RS ports 24, 25, 26 and 27 are preset in consideration of other UEs, it is necessary to determine a CSI-RS most suitable for the corresponding UE through reporting of RSRP of RRM-RS.

The present invention additionally proposes a method for measuring and reporting RSRP for an antenna port group. A UE may average RSRPs of antenna ports belonging to a plurality of groups to acquire RSRP of a corresponding antenna port group. The group may be predetermined or determined and signaled by the eNB. Otherwise, the UE may determine an antenna port grouping scheme and signal the same.

In the case of 32-port RRM-RS as shown in FIG. 8, 4 antenna ports may be grouped as one group. The 32 antenna ports may be grouped into 8 (32/4) groups disjointly. In this case, an i-th antenna port group consists of RRM-RS ports 4i, 4i+1, 4i+2 and 4i+3. Here, i is an integer in the range of 0 to 7. RSRP of the i-th antenna port group is defined as the average of RSRPs of antenna ports 4i, 4i+1, 4i+2 and 4i+3. Alternatively, antenna ports may be jointly grouped.

Alternatively, when four of 32 RRM-RS ports are grouped into one group, the 32 RRM-RS ports are grouped into 15 groups. In this case, the i-th antenna port group consists of RRM-RS ports 2i, 2i+1, 2i+2 and 2i+3. Here, i is an integer in the range of 0 to 14. When the proposed scheme is normalized to group A antenna ports as one group and to set an interval between neighboring antenna port groups to B, the i-th antenna port group is composed of RRM-RS ports B*i, (B*i+1), (B*i+A−1). Parameters A and B are set by the eNB for the UE or selected and reported by the UE in consideration of channel environment and UE capability In a modification of the proposed scheme, the UE may select an antenna port group to be reported in consideration of capacity that can be obtained with the corresponding antenna port group rather than RSRP. In this case, the UE calculates the capacity in consideration of multi-layer data transmission from a plurality of antenna ports in the antenna port group.

[Antenna Port Grouping Level]

In the proposed scheme, a method of grouping antenna ports into groups having different sizes may be used. That is, a method of grouping A1 antenna ports as one group and a method of grouping A2 antenna ports as one group may be simultaneously used. Here, a method of grouping A_i antenna ports as one group is referred to as antenna grouping level i. FIG. 9 illustrates an example of a method of grouping 16 RRM-RS antenna ports using 4 grouping levels. In the example, grouping level 1 refers to a method of grouping one antenna port as one group, which does not form an antenna group. Grouping levels 2, 3 and 4 respectively refer to methods of grouping 2 antenna ports, 4 antenna ports and 8 antenna ports as one group. In the example of FIG. 9, antenna port groups of the same level are disjointly set.

In this grouping method, the UE reports RSRP per grouping level. That is, the UE may select an antenna port group with high RSRP per grouping level and report the selected antenna port group. Otherwise, the UE may compare RSRPs of antenna port groups of different levels and report information (i.e. antenna grouping level, antenna group index, etc.) on an antenna port group having highest RSRP. To compare RSRPs of antenna port groups of different antenna grouping levels, a predetermined offset may be applied to RSRP of the antenna port group of each level. When R RRM-RSs are configured and RSRP of a g-th antenna port group of an l-th grouping level of an r-th RRM-RS is defined as GRSRP(r,l,g), offset(r,l) designated by the eNB for the l-th grouping level of the r-th RRM-RS is applied to GRSPR(r,l,g) to calculate Adj_GRSRP(r,l,g) and compare the same as follows.\

Adj_GRSRP(r,l,g)=GRSRP(r,l,g)+offset(r,l)  [Equation 14]

In addition, RSRP may be corrected by adding a hysteresis parameter (Hy) per antenna grouping level or in order to reduce frequent change of RSRPs of L antenna port groups corresponding to higher RSRPs, which are reported according to the method of reporting RSRPs of the L antenna port groups corresponding to higher RSRPs.

Adj_GRSRP(r,l,g)=GRSRP(r,l,g)+offset(r,l)±Hy  [Equation 15]

Here, addition or subtraction of Hy is determined depending on whether a corresponding antenna port group is included in the L antenna port groups having higher RSRPs in a previous report. When the corresponding antenna group is included in the L antenna port groups having higher RSRPs in the previous report, Hy may be added to RSRP of the corresponding antenna group such that the corresponding antenna port has high Adj_RSRP so as to prevent the L antenna port groups having higher GRSPRs from being frequently changed.

Alternatively, the UE may be assigned a reference antenna port group. The eNB preferably designates an antenna port group corresponding to an RRM-RS transmitted by the serving cell, which has the same beam direction as that of a precoded CSI-RS configured for the UE, as the reference antenna port group. The UE may be assigned a reference antenna port group per antenna grouping level. Otherwise, the UE may be assigned one reference antenna port group for all grouping levels. When an (m_0)-th antenna port group of an (l_0)-th grouping level of an (r_0)-th RRM-RS is designated as the reference antenna group for the UE, the UE reports Adj_GRSRPs of other antenna port groups when a difference between Adj_GRSRPs of the other antenna port groups and Adj_GRSRP of the reference port group exceeds a predetermined threshold. That is, the UE may report RSRP when an RSRP difference exceeds the predetermined threshold as represented by Equation 16.

Adj_GRSRP(r,l,g)−Adj_GRSRP(r_0,l_0,m_0)> Threshold  [Equation 16]

In a modification of the proposed method, a reference RSRP is specified through the currently configured CSI-RS such that the UE compares RRM-RS based RSRP with CSI-RS based RSRP, selects RSRP and reports the same.

[RRM-RS for 3D Beamforming]

The aforementioned proposed method may be modified and applied when beam directivity is extended from 2D space to 3D space. Beam directivity in the 3D space is adjusted by two angles, vertical angle (φ of FIG. 7(b)) and horizontal angle (θ of FIG. 7(b)). Accordingly, it is efficient to index beams with two indexes, that is, a horizontal index and a vertical index in order to check whether the beams are neighboring beams. RRM-RS ports need to be indexed with a horizontal index and a vertical index to one-to-one match beam indexes to RRM-RS port indexes according to characteristics of the present invention.

In the case of a 3D MIMO system having M_v beams in the vertical direction and M_h beams in the horizontal direction, (M_v*M_h) beams are available. The present invention sets (M_v*M_h)-port RRM-RS and provides horizontal indexes j_h (j_h=0, M_h−1) and vertical indexes j_v (j_v=0, . . . , M_v−1) to the respective antenna ports. The antenna ports are given 1D indexes i (i=0, . . . , M_v*M_h−1) and 2D indexes j_h and j_v in consideration of resource mapping of the (M_v*M_h−1)-port RRM-RS. Here, i=f(j_h, j_v).

Figure 10:
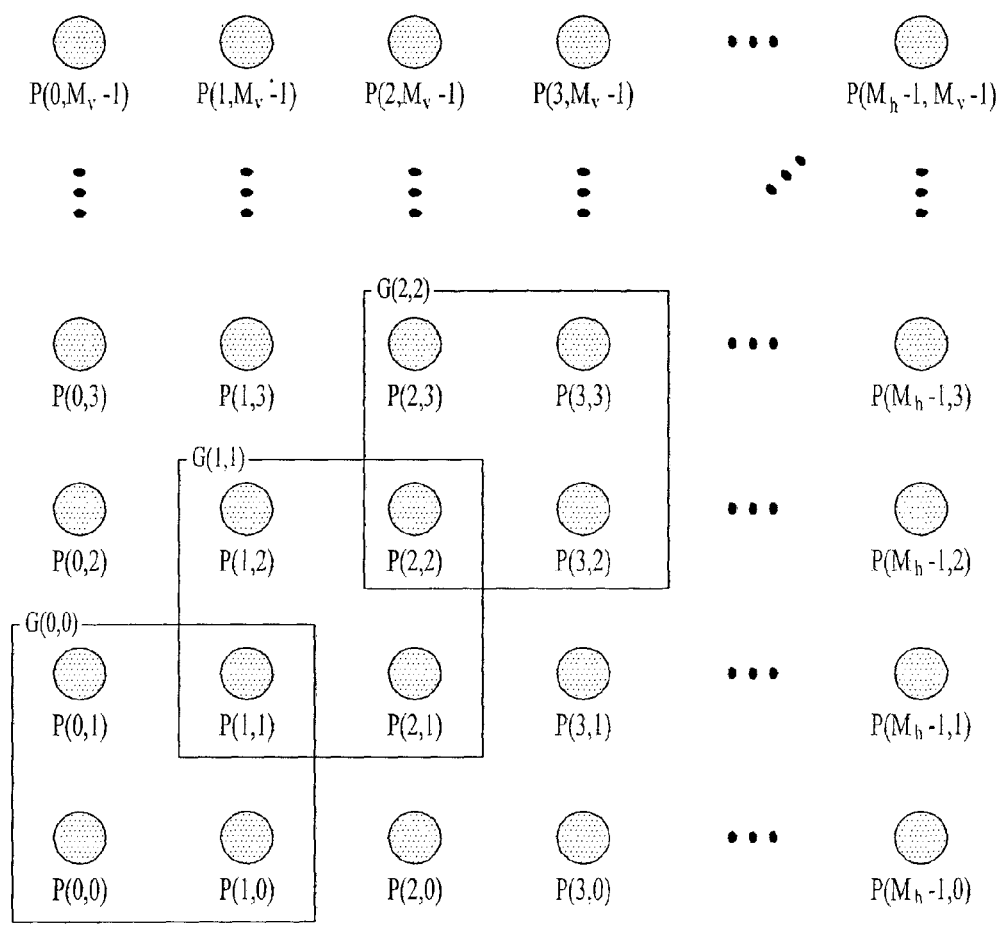
FIG. 10 illustrates antenna arrangement and antenna groups therefor in accordance with embodiment(s) of the disclosure

FIG. 10 illustrates antenna ports arranged with 2D indexes. In FIG. 10, the antenna ports are indexed with (j_h, j_v). When A_h*A_v ports are grouped as one group according to the proposed method and horizontal and vertical port intervals between neighboring groups are respectively set to B_h and B_v, the (i_h, i_v)-th antenna port group is composed of RRM-RS ports (B_h*h+k_h, B_v*i_v+k_v) (k_h=0, . . . , A_h−1). Parameters A_h, A_v, B_h and B_v may be designated by the eNB for the UE or selected and reported by the UE in consideration of channel environment and UE capabilities.

[Difference Between RRM-RS and CSI-RS]

In LTE, a CSI-RS is transmitted to report CSI. The UE reports an RI, PMI, CQI, etc. as CSI. The RRM-RS proposed by the present invention is used to measure RSRP per antenna port. Accordingly, it is desirable to use resources that can be configured by CSI-RS rather than newly defining resources for transmission of RRM-RS to prevent transmission efficiency of legacy UEs from decreasing. Since the legacy UEs do not recognize RRM-RS when the RRM-RS is transmitted through a new resource, transmission efficiency is deteriorated or scheduling cannot be performed in a subframe in which the RRM-RS transmitted. When the RRM-RS is transmitted using a resource that can be configured by CSI-RS, CSI-RS including the resource may be configured for the legacy UEs to inform the legacy UEs that data is not mapped to the resource.

Data is not mapped to a plurality of CSI-RSs configured for a UE for CSI reporting. That is, a PDSCH is mapped to an RE other than an RE to which CSI-RS is mapped. In a method proposed by the present invention, a PDSCH may be mapped to an RE other than an RE to which RRM-RS is mapped. However, the PDSCH may be mapped irrespective of RRM-RS in a modified method. In this case, the UE needs to be able to simultaneously receive RRM-RS and PDSCH through the same RE. Otherwise, the eNB may set a corresponding resource as a zero power (ZP)-CSI-RS in order to secure safe reception of RRM-RS such that the PDSCH is not mapped to the resource.

[Setting of QCL of RRM-RS]

When each cell transmits RMR-RS, the UE may be assigned configurations of RRM-RSs transmitted from the serving cell and a neighboring cell. Accordingly, the UE measures gain according to beamforming of the serving cell and gain of beamforming of the neighboring cell and reports the measured gains to a network such that the gains are used as the basis of determination of handover. RRM-RS may not be suitable for signal tracking since transmission density of RRM-RS is set to a very low value. Accordingly, a CRS is tracked as a representative of signals received with high density and high reliability and the CRS tracking result is used to detect the RRM-RS. That is, since a CRS tracking result of the serving cell is not suited to use for RRM-RS transmitted from a neighboring cell due to error of an oscillator that generates carrier frequencies of the serving cell and the neighboring cell, a quasi co-located (QCL) CRS (or specific RS such as a CSI-RS) to be used to detect RRM-RS is signaled per RRM-RS. The UE uses large-scale characteristics of a channel estimated from the QCL CRS (or specific RS such as CSI-RS) for RRM-RS detection. Here, the large-scale characteristics of the channel may include at least one of delay spread, Doppler spread, Doppler shift, average gain and average delay. For example, the UE may use Doppler spread, Doppler shift estimated from the QCL CRS to detect RRM-RS.

[Extension to RSRQ]

The aforementioned proposed methods may be extended and applied to a method of measuring RSRQ per antenna port. RSRQ is defined as the ratio of RSRP to a received signal strength indicator (RSSI). Accordingly, measurement of the RSSI is added in order to measure the RSRQ. The same RSSI measurement resource may be set for all RRM-RSs having the same carrier frequency, that is, all RRM-RSs configured for the same component carrier. In this case, comparison of ports of RRM-RSs in the same component carrier is performed in the same manner irrespective of RSRP and RSRQ. However, comparison of ports of RRM-RSs in different component carriers depends on whether RSRP or RSRQ is used. Accordingly, the eNB designates one of RSRP and RSRQ for the UE when the UE performs RRM-RS based RRM reporting.

Alternatively, the eNB may separately set an RSSI measurement resource per RRM-RS. In this case, comparison of ports of RRM-RSs depends on whether RSRP or RSRQ is used even in the same component carrier. Accordingly, the eNB may determine whether the UE uses RSRP or RSRQ to perform RRM-RS based RRM reporting.

[Correlation Between RRM-RS RSRP and CRS RSRP]

RRM-RS based RSRP according to the present invention is used to apply beamforming gain of an eNB having a plurality of antennas to selection of a serving cell. Even when it is determined that a specific neighboring cell has performed beamforming with highest quality, on the basis of RSRP of RRM-RS, if channels broadcast by the corresponding cell, that is, CRS-based demodulated channels are stably received, then a UE cannot be handed over to the neighboring cell. Accordingly, the eNB needs to receive a report on whether both RRM-RS and CRS transmitted from a specific eNB have high quality from the UE, determine handover and select a beam on the basis of the report. To achieve this, the UE reports RSRP of CRS related to an i-th RRM-RS configured therefor while reporting RSRP of a j-th antenna port or antenna port group of the i-th RRM-RS. Here, the CRS related to the RRM-RS may be a QCL CRS for the RRM-RS.

Figure 11:
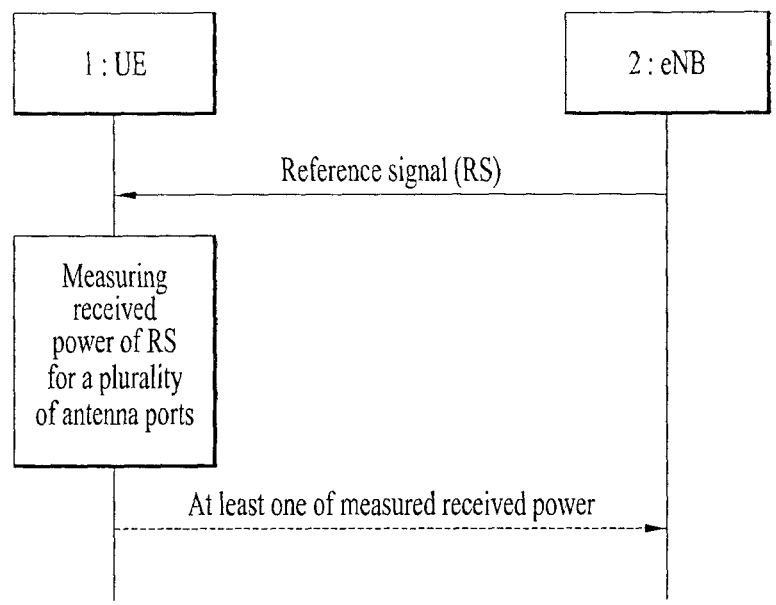
FIG. 11 is a diagram showing operation according to one embodiment of the present invention.

FIG. 11 illustrates operation according to an embodiment of the present invention. A wireless communication system in which the operation shown in FIG. 11 can be performed includes a plurality of antenna ports. For example, the wireless communication system may be a large-scale MIMO communication system.

A UE 1 may receive, from an eNB 2, a precoded reference signal according to configuration of the precoded reference signal for the plurality of antenna ports (S1101). The UE 1 may receive information on the precoded reference signal configuration from the eNB. The information may include information on a resource through which the precoded reference signal is transmitted, a precoded reference signal transmission period and an antenna port through which the precoded reference signal is transmitted.

The UE may measure Rx power of the reference signal per antenna port (S1102). In the case of large-scale MIMO communication, the eNB may include a relatively large number of antenna ports and thus transmission beams may be different for the antenna ports according to precoding. Accordingly, the reference signal transmitted through each antenna port according to an embodiment of the present invention may be individually beamformed, that is, precoded.

The UE may report at least one of the measured Rx power values of the plurality of antenna ports to the eNB (S1103). Tx power values of a plurality of reference signals may be measured in step S1102. Accordingly, the UE may transmit a maximum value of a plurality of values or higher L values to the eNB. In addition, the UE may transmit information on the corresponding antenna port as well as the Rx power value to the eNB.

The reference signal may be used for serving cell search of the UE. As described above, CRS based RSRP or RSRQ measurement during initial access or handover determination may not be suitable in the wireless communication system in which an embodiment of the present invention is implemented, and thus the reference signal may be used for serving cell search according to an embodiment of the present invention.

The embodiment related to FIG. 11 may alternatively or additionally include at least some of the aforementioned embodiments.

Figure 12:
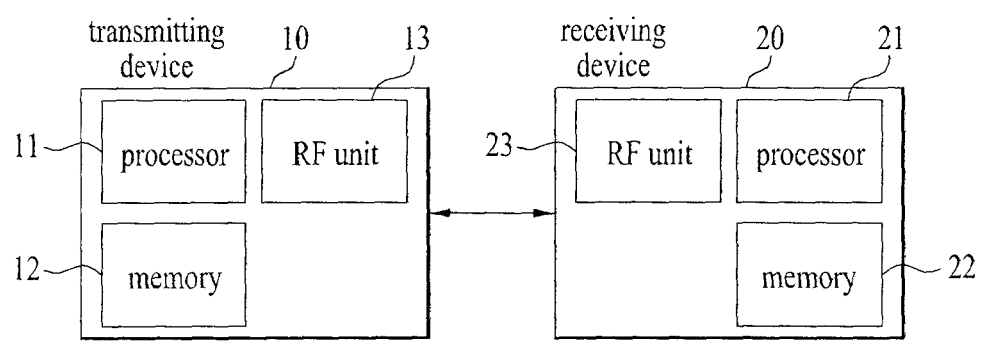
FIG. 12 is a block diagram of an apparatus for implementing embodiment(s) of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), relay, or base station (BS).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving, by a user equipment (UE), downlink signal from an eNB having a plurality of antenna ports in a wireless communication system, the method comprising:
    receiving a precoded reference signal according to a precoded reference signal configuration composing the plurality of antenna ports;
    measuring received power value of the reference signal for each of the plurality of antenna ports,
    wherein the plurality of antenna ports are grouped into antenna groups each of which is composed of two or more antenna ports and the antenna groups are configured to have antenna group levels corresponding to the number of antenna ports belonging to each antenna group;
    applying an offset designated for each of the antenna group levels to the received power values of the reference signal to derive the highest received power value of the reference signal among the antenna groups; and
    reporting, to the eNB, at least one of measured received power values for the antenna groups, and information about an antenna group having the highest received power value of the reference signal among the antenna groups.

2. The method according to claim 1, wherein resources for the precoded reference signal include at least part of resources for a channel state information-reference signal (CSI-RS) configurable for the UE.

3. The method according to claim 1, wherein the reporting includes:
    transmitting, to the eNB, a maximum value from among the measured received power values for the plurality of antenna ports, and selected received power value(s) ranging between a predetermined threshold and the maximum value.

4. The method according to claim 1, wherein the reporting includes:
    transmitting, to the eNB, a power value of the reference signal received from a predetermined reference antenna port from among the plurality of antenna ports, and selected received power value(s) ranging between a predetermined threshold and the power value.

5. The method according to claim 1, wherein two or more antenna groups from among the antenna groups include at least one identical antenna port.

6. The method according to claim 1, further comprising transmitting, to the eNB, information about an antenna group having the highest received power value of the reference signal according to the antenna group levels.

7. The method according to claim 1, further comprising receiving information on determination of handover to another eNB based on the reported at least one of measured received power values.

8. The method according to claim 1, further comprising receiving a configuration related to a CSI-RS based on the reported at least one of measured received power values.

9. The method according to claim 1, further comprising receiving information on another reference signal to be used to detect the reference signal.

10. The method according to claim 1, wherein the plurality of antenna ports is two-dimensionally arranged.

11. A User Equipment (UE) configured to receive a downlink signal from an eNB having a plurality of antenna ports in a wireless communication system, the UE comprising:
    a radio frequency (RF) unit; and
    a processor configured to control the RF unit,
    wherein the processor is configured to
        receive a precoded reference signal according to a precoded reference signal configuration composing the plurality of antenna ports,
        measure received power value of the reference signal for each of the plurality of antenna ports,
        wherein the plurality of antenna ports are grouped into antenna groups each of which is composed of two or more antenna ports and the antenna groups are configured to have antenna group levels corresponding to the number of antenna ports belonging to each antenna group,
        apply an offset designated for each of the antenna group levels to the received power values of the reference signal to derive the highest received power value of the reference signal among the antenna groups, and
        report, to the eNB, at least one of measured received power values for the antenna groups, and information about an antenna group having the highest received power value of the reference signal among the antenna groups.

12. A method for transmitting, by an eNB having a plurality of antenna ports, a downlink signal to a User Equipment (UE) in a wireless communication system, the method comprising:
    transmitting a precoded reference signal according to a precoded reference signal configuration composing the plurality of antenna ports, wherein the plurality of antenna ports are grouped into antenna groups each of which is composed of two or more antenna ports and the antenna groups are configured to have antenna group levels corresponding to the number of antenna ports belonging to each antenna group; and
    receiving, from the UE, at least one of received power values of the reference signal measured by the UE for the antenna groups, and information about an antenna group having the highest received power value of the reference signal among the antenna groups,
    wherein the highest received power value of the reference signal among the antenna groups is derived by applying an offset designated for each of the antenna group levels to received power values of the reference signal.

* * * * *